United States Patent
Arao

(10) Patent No.: US 11,378,753 B2
(45) Date of Patent: Jul. 5, 2022

(54) OPTICAL CONNECTING STRUCTURE FOR CONNECTING MULTI-CORE FIBERS

(71) Applicant: SUMITOMO ELECTRIC INDUSTRIES, LTD., Osaka (JP)

(72) Inventor: Hajime Arao, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/933,105

(22) Filed: Jul. 20, 2020

(65) Prior Publication Data
US 2021/0026075 A1 Jan. 28, 2021

(30) Foreign Application Priority Data
Jul. 23, 2019 (JP) .............................. JP2019-135482

(51) Int. Cl.
*G02B 6/30* (2006.01)
*G02B 6/32* (2006.01)

(52) U.S. Cl.
CPC ..................... *G02B 6/32* (2013.01)

(58) Field of Classification Search
CPC ....................................... G02B 6/32
USPC ......................................... 385/33
See application file for complete search history.

(56) References Cited

U.S. PATENT DOCUMENTS

| | | | |
|---|---|---|---|
| 10,234,632 B1 * | 3/2019 | Keeler | G02B 6/4206 |
| 2003/0179993 A1 * | 9/2003 | Shigenaga | G02B 6/3885 385/33 |
| 2012/0251045 A1 * | 10/2012 | Budd | G02B 13/22 385/33 |
| 2012/0328238 A1 | 12/2012 | Inoue et al. | |
| 2013/0088771 A1 * | 4/2013 | Li | H04J 14/04 359/341.3 |
| 2013/0287347 A1 | 10/2013 | Taru et al. | |
| 2013/0302032 A1 * | 11/2013 | Shimakawa | G02B 6/2937 398/48 |
| 2014/0093211 A1 | 4/2014 | McColloch et al. | |
| 2015/0378104 A1 * | 12/2015 | Takahashi | G02B 17/0621 385/50 |

(Continued)

FOREIGN PATENT DOCUMENTS

| | | |
|---|---|---|
| JP | 2013-020227 A | 1/2013 |
| JP | 2013-228548 A | 11/2013 |
| JP | 2017-187644 A | 10/2017 |

*Primary Examiner* — Kaveh C Kianni
(74) *Attorney, Agent, or Firm* — Oliff PLC

(57) ABSTRACT

An optical connecting structure for connecting multi-core fibers is disclosed. The optical connecting structure includes first multi-core fibers of which each optical fiber includes cores, second multi-core fibers of which each optical fiber includes cores, a first optical system which allows at least a part of light beams emitted from the cores of each first multi-core fiber to have different propagation directions, and a second optical system which allows each light beam emitted from each first multi-core fiber and propagated through the first optical system to be condensed on the plurality of second multi-core fibers. A first fiber array where the first multi-core fibers are arrayed in a first surface intersecting an optical axis of the first optical system corresponds to a first core array where the cores in the respective optical fibers of the first multi-core fibers are arrayed in the first surface.

20 Claims, 15 Drawing Sheets

(56) References Cited

U.S. PATENT DOCUMENTS

| | | | |
|---|---|---|---|
| 2016/0061672 A1* | 3/2016 | Ohtsuka | G01D 5/35303 |
| | | | 356/35.5 |
| 2016/0246015 A1* | 8/2016 | Case | G02B 6/4206 |
| 2017/0293092 A1 | 10/2017 | Sano et al. | |
| 2018/0337726 A1* | 11/2018 | Oda | H04B 10/54 |
| 2019/0249982 A1* | 8/2019 | Froggatt | G02B 6/02 |
| 2020/0310047 A1* | 10/2020 | Austin | G02B 6/3885 |

* cited by examiner

*Fig.12A*
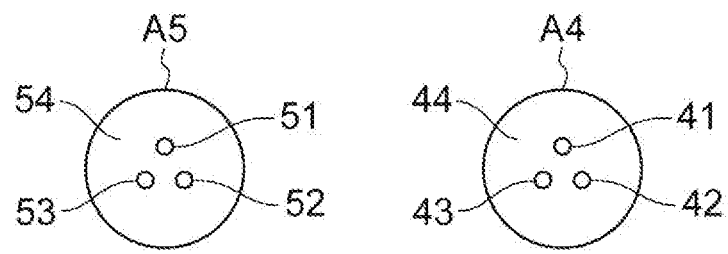
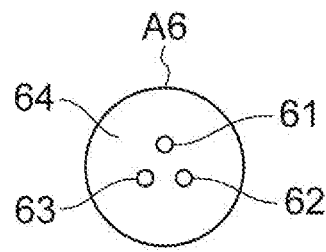
*Fig.12B*
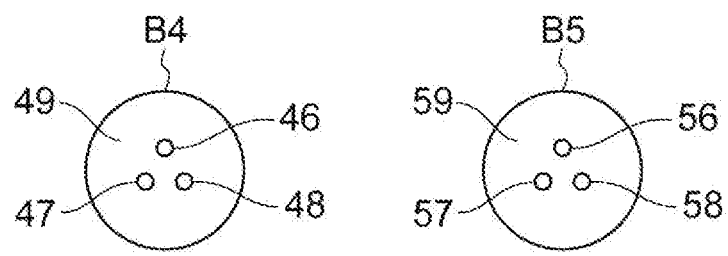
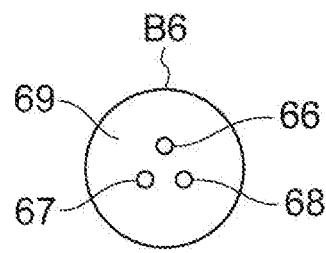

OPTICAL CONNECTING STRUCTURE FOR CONNECTING MULTI-CORE FIBERS

CROSS REFERENCE TO RELATED APPLICATION

This application is based upon and claims the benefit of priority from Japanese Patent Application No. 2019-135482, filed on Jul. 23, 2019, the entire contents of which are incorporated herein by references.

TECHNICAL FIELD

The present disclosure relates to an optical connecting structure for connecting multi-core fibers.

BACKGROUND

JP2013-228548A discloses a multi-core fiber in which a plurality of cores are provided in one optical fiber. JP2013-020227A discloses an optical device in which one multi-core fiber is connected to a plurality of single core fibers. JP2017-187644A and US2014/0093211A disclose a wiring structure for cross-connecting a plurality of optical fibers.

SUMMARY

The present disclosure provides an optical connecting structure for connecting multi-core fibers. The optical connecting structure includes a plurality of first multi-core fibers of which each optical fiber includes a plurality of cores, a plurality of second multi-core fibers of which each optical fiber includes a plurality of cores, a first optical system which allows at least a part of light beams emitted from the cores of each first multi-core fiber to have different propagation directions, and a second optical system which allows each light beam emitted from each first multi-core fiber and propagated through the first optical system to be condensed on the plurality of second multi-core fibers. In the optical connecting structure, a first fiber array where the first multi-core fibers are arrayed corresponds to a first core array where the cores in the respective optical fibers of the first multi-core fibers are arrayed in a first surface intersecting an optical axis of the first optical system, and a second fiber array where the second multi-core fibers are arrayed corresponds to a second core array where the cores in the respective optical fibers of the second multi-core fibers are arrayed in a second surface intersecting an optical axis of the second optical system.

BRIEF DESCRIPTION OF THE DRAWINGS

The foregoing and other purposes, aspects and advantages will be better understood from the following detailed description of embodiments of the disclosure with reference to the drawings, in which:

FIG. 12A is a cross-sectional view schematically illustrating a fiber array and core arrays of a first multi-core fiber group according to the second embodiment, and FIG. 12B is a cross-sectional view schematically illustrating a fiber array and core arrays of a second multi-core fiber group according to the second embodiment;

FIG. 13A illustrates a positional relationship of the first multi-core fiber group, and FIG. 13B illustrates a positional relationship of the second multi-core fiber group;

DETAILED DESCRIPTION

Figure 1A:
FIG. 1A is a plan view illustrating a first multi-core fiber group and a second multi-core fiber group connected to each other by an optical connecting structure according to a first embodiment.

Problem to be Solved by Present Disclosure

JP2013-020227A discloses an example of an optical connecting structure for connecting one multi-core fiber to a plurality of single core fibers. This optical connecting structure of JP2013-020227A cannot be used as it is for an optical connecting structure for connecting a first plurality of multi-core fibers to a second plurality of multi-core fibers. On the other hand, it is conceivable that the light beams from the cores of the first multi-core fiber are first separated into single core fibers by using fan-out and then are connected to the second multi-core fibers. In this case, the optical connecting structure for connecting the first multi-core fibers to the second multi-core fibers can increase in size.

Effects of Present Disclosure

According to one aspect of the present disclosure, an optical connecting structure for connecting multi-core fibers can be miniaturized.

Description of Embodiments of Present Disclosure

Embodiments of the present disclosure will be listed and described. An optical connecting structure for connecting multi-core fibers according to one embodiment of the present disclosure includes a plurality of first multi-core fibers of which each optical fiber includes a plurality of cores, a plurality of second multi-core fibers of which each optical fiber includes a plurality of cores, a first optical system which allows at least a part of light beams emitted from the cores of each first multi-core fiber to have different propagation directions, and a second optical system which allows each light beam emitted from each first multi-core fiber and propagated through the first optical system to be condensed on the plurality of second multi-core fibers. In the optical connecting structure, a first fiber array where the first multi-core fibers are arrayed corresponds to a first core array where the cores in the respective optical fibers of the first multi-core fibers are arrayed in a first surface intersecting an optical axis of the first optical system, and a second fiber array where the second multi-core fibers are arrayed corresponds to a second core array where the cores in the respective optical fibers of the second multi-core fibers are arrayed in a second surface intersecting an optical axis of the second optical system.

In the optical connecting structure for connecting the multi-core fibers, the first fiber array of the first multi-core fibers corresponds to the first core array of each first multi-core fiber, and the second fiber array of the second multi-core fibers corresponds to the second core array of each second multi-core fiber. Since the core array in each optical fiber is correlated with the fiber array of the optical fibers themselves, the plurality of first multi-core fibers and the plurality of second multi-core fibers can be optically connected to each other by a simple configuration using the first optical system and the second optical system. Particularly, in the optical connecting structure in which the cores of one first multi-core fiber are branched to the plurality of second multi-core fibers, the connecting structure is simplified by adopting the above-described array relationship. Accordingly, the miniaturization thereof can be achieved.

As one embodiment, the first optical system may be configured to set respective focal points thereof on corresponding end surfaces of the first multi-core fibers, and the second optical system may be configured to set respective focal points thereof on corresponding end surfaces of the second multi-core fibers. In this embodiment, the light beams between the first optical system and the second optical system becomes collimated light and the optical design is facilitated.

As one embodiment, the first optical system may include a first lens corresponding to each first multi-core fiber, and the second optical system may include a second lens corresponding to each second multi-core fiber. In this embodiment, the propagation direction of the light beam emitted from each multi-core fiber can be more accurately set. In this embodiment, the first lenses may be integrated into one first lens array and the second lenses may be integrated into one second lens array. In this case, the optical design, the manufacturing of the device, or the like is facilitated.

As one embodiment, the respective first multi-core fibers may have the same core array and refractive index distribution as those of the second multi-core fiber. In this embodiment, the optical design of the entire optical connecting structure can be facilitated.

As one embodiment, the first fiber array may be similar (homothetic) to the first core array, and the second fiber array may be similar (homothetic) to the second core array. In this embodiment, the design of the optical connecting structure for connecting the plurality of first multi-core fibers to the plurality of second multi-core fibers can be facilitated. In this embodiment, the first fiber array, the first core array, the second fiber array, and the second core array may be one-dimensional arrays.

As one embodiment, the first fiber array may be similar (homothetic) to an array in which the first core array is rotated around a fiber optical axis by 180°, and the second fiber array may be similar (homothetic) to an array in which the second core array is rotated around a fiber optical axis by 180°. In this embodiment, the multi-core fibers or the cores in each fiber can be easily arranged two-dimensionally, and then an optical connecting structure having a higher packaging density can be provided and miniaturization can be achieved.

As one embodiment, the first multi-core fibers and the second multi-core fibers may be arranged such that first end surfaces of the first multi-core fibers face second end surfaces of the second multi-core fibers. The first optical system may be disposed adjacent to the first end surfaces of the first multi-core fibers and the second optical system may be disposed adjacent to the second end surfaces of the second multi-core fibers, and the first optical system and the second optical system may be located between the first end surfaces and the second end surfaces.

As one embodiment, the first multi-core fibers may include at least three multi-core fibers and the second multi-core fibers may include at least three multi-core fibers.

Detailed Description of Embodiments of Present Disclosure

Detailed examples of an optical connecting structure for connecting multi-core fibers according to the present disclosure will be described below with reference to the drawings. The present invention is not limited to these examples. The present invention is indicated by claims, and it is intended to include all changes within meanings and a range equivalent to the claims. In the following description, the same reference numbers are assigned to the same components or to similar components having the same function in the description of the drawings, and overlapping description will be omitted.

First Embodiment

Figure 1B:
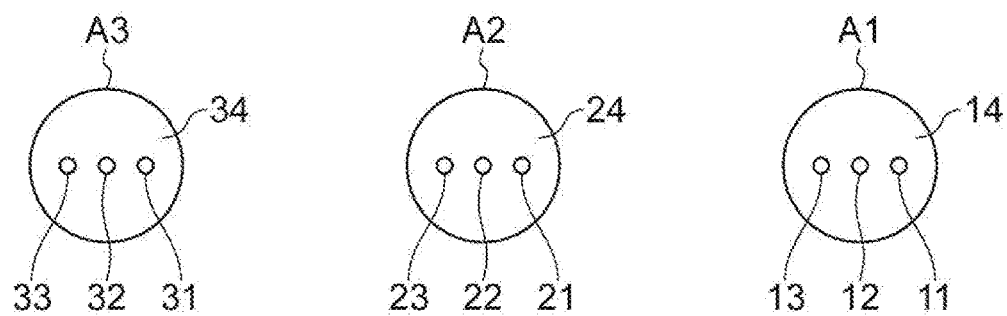
FIG. 1B is a cross-sectional view of the first multi-core fiber group taken along a line b-b of FIG. 1A.
Figure 1C:
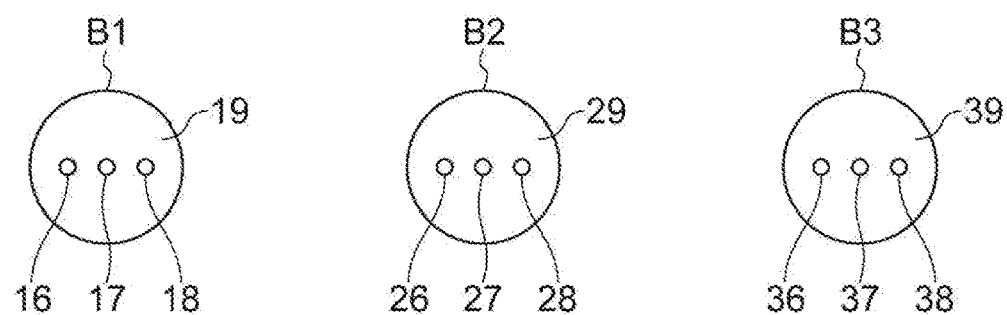
FIG. 1C is a cross-sectional view of the second multi-core fiber group taken along a line c-c of FIG. 1A.

FIG. 1A is a plan view illustrating a positional relationship between a first multi-core fiber group A and a second multi-core fiber group B optically connected to each other by an optical connecting structure according to a first embodiment. FIG. 1B is a view illustrating a cross-section of each multi-core fiber included in the first multi-core fiber group A. FIG. 1C is a view illustrating a cross-section of each multi-core fiber included in the second multi-core fiber group B. As illustrated in FIGS. 1A to 1C, the optical connecting structure according to this embodiment optically connects the first multi-core fiber group A including a plurality of multi-core fibers A1, A2, and A3, with the second multi-core fiber group B including a plurality of multi-core fibers B1, B2, and B3 by using a spatial optical system. The multi-core fibers A1 to A3 respectively include a plurality of cores 11, 12, and 13, a plurality of cores 21, 22, and 23, and a plurality of cores 31, 32, and 33. The cores 11 to 13, the cores 21 to 23, and the cores 31 to 33 are respectively covered with a cladding 14, a cladding 24, and a cladding 34 to thereby constitute each multi-core fiber. Similarly to the multi-core fibers A1 to A3, the multi-core fibers B1 to B3 respectively include a plurality of cores 16, 17, and 18, a plurality of cores 26, 27, and 28, and a plurality of cores 36, 37, and 38. The cores 16 to 18, the cores 26 to 28, and the cores 36 to 38 are respectively covered with a cladding 19, a cladding 29, and a cladding 39 to thereby constitute each multi-core fiber. In this embodiment, the fiber array of the multi-core fibers A1 to A3 corresponds to the respective core arrays of the multi-core fibers A1 to A3 and the fiber array of the multi-core fibers B1 to B3 corresponds to the respective core arrays of the multi-core fibers B1 to B3 in this way.

In the optical connecting structure according to this embodiment, the first multi-core fiber group A and the second multi-core fiber group B are configured to be optically connected to each other as shown in Table 1 below by a spatial optical system to be described later (see FIGS. 4A to 4C). Specifically, the core 11, the core 12, and the core 13 of the multi-core fiber A1 are respectively optically connected to the core 38 of the multi-core fiber B3, the core 28 of the multi-core fiber B2, and the core 18 of the multi-core fiber B1. The core 21, the core 22, and the core 23 of the multi-core fiber A2 are respectively optically connected to the core 37 of the multi-core fiber B3, the core 27 of the multi-core fiber B2, and the core 17 of the multi-core fiber B1. The core 31, the core 32, and the core 33 of the multi-core fiber A3 are respectively optically connected to the core 36 of the multi-core fiber B3, the core 26 of the multi-core fiber B2, and the core 16 of the multi-core fiber B1.

TABLE 1

| First multi-core fiber group | Core | | Second multi-core fiber group | Core |
|---|---|---|---|---|
| Multi-core fiber A1 | Core 11 | ⇔ | Multi-core fiber B3 | Core 38 |
| | Core 12 | ⇔ | Multi-core fiber B2 | Core 28 |
| | Core 13 | ⇔ | Multi-core fiber B1 | Core 18 |
| Multi-core fiber A2 | Core 21 | ⇔ | Multi-core fiber B3 | Core 37 |
| | Core 22 | ⇔ | Multi-core fiber B2 | Core 27 |
| | Core 23 | ⇔ | Multi-core fiber B1 | Core 17 |
| Multi-core fiber A3 | Core 31 | ⇔ | Multi-core fiber B3 | Core 36 |
| | Core 32 | ⇔ | Multi-core fiber B2 | Core 26 |
| | Core 33 | ⇔ | Multi-core fiber B1 | Core 16 |

Figure 2:
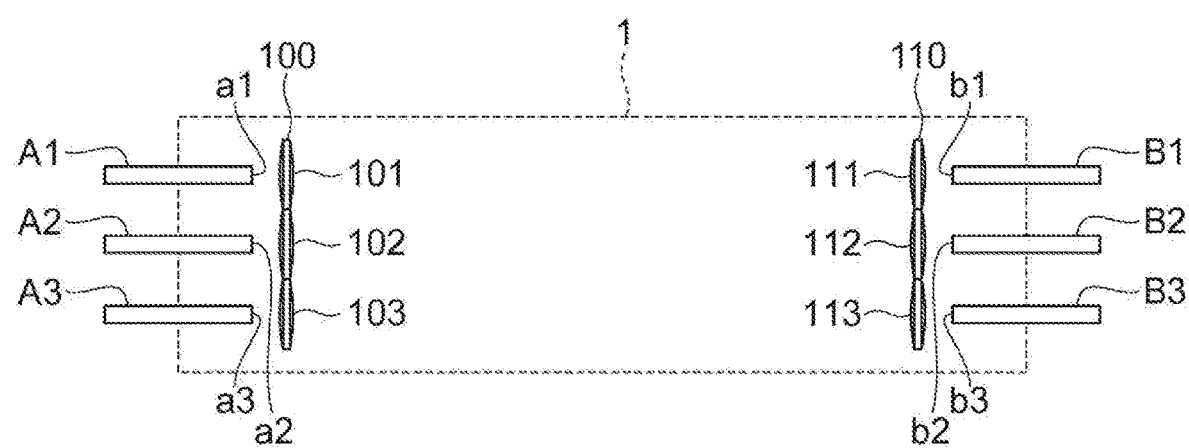
FIG. 2 is a plan view schematically illustrating the optical connecting structure according to the first embodiment.

FIG. 2 is a plan view illustrating an example of an optical connecting structure in which the first multi-core fiber group A is optically connected to the second multi-core fiber group B. As illustrated in FIG. 2, an optical connecting structure 1 optically connects the multi-core fibers A1 to A3 of the first multi-core fiber group to the multi-core fibers B1 to B3 of the second multi-core fiber group. The optical connecting structure 1 is provided with a first optical system 100 and a second optical system 110. The first optical system 100 is disposed adjacent to end surfaces a1, a2, a3 of the first multi-core fibers A1 to A3 so as to face the first multi-core fibers A1 to A3. The second optical system 110 is disposed adjacent to end surfaces b1, b2, b3 of the second multi-core fibers B1 to B3 so as to face the second multi-core fibers B1 to B3. In the optical connecting structure 1, the first multi-core fibers A1 to A3 and the second multi-core fibers B1 to B3 are arranged such that the end surfaces a1 to a3 of the first multi-core fibers A1 to A3 face the end surfaces b1 to b3 of the second multi-core fibers B1 to B3 along an optical axis of each multi-core fiber. The first optical system 100 and the second optical system 110 are located between the end surfaces a1 to a3 of the first multi-core fibers A1 to A3 and the end surfaces b1 to b3 of the second multi-core fibers B1 to B3. In this embodiment, a configuration in which three multi-core fibers are connected to each other will be described as an example, but the present disclosure is not limited thereto. The number of the multi-core fibers connected to each other may be two or more. The number of the first multi-core fibers can be the same as the number of the second multi-core fibers. Further, a configuration in which the number of the cores arranged in each multi-core fiber is three will be described, but the present disclosure is not limited thereto. The number of the cores arranged in each multi-core fiber may be two or more.

The first optical system 100 includes condensing lenses 101, 102, and 103 which respectively correspond to the multi-core fibers A1 to A3. The condensing lenses 101 to 103 respectively include optical axes X1, X2, and X3 and are set so that the focal points thereof are respectively located on the end surfaces a1 to a3 of the corresponding multi-core fibers A1 to A3. The optical axes X1 to X3 (see FIG. 3A) of the condensing lenses 101 to 103 are arranged so as to coincide with any position of the cores of the multi-core fibers A1 to A3. However, the optical axes X1 to X3 may be arranged so as not to coincide with any position of the cores of the multi-core fibers A1 to A3. The condensing lenses 101 to 103 may be integrated to one lens array and each of the condensing lenses 101 to 103 may be configured as separate members. Since the condensing lenses 101 to 103 can be arranged as an integrated object in the former case, the configuration and the manufacturing method are facilitated.

The second optical system 110 includes condensing lenses 111, 112, and 113 which respectively correspond to the multi-core fibers B1 to B3. The condensing lenses 111 to 113 respectively include optical axes X1, X2, and X3 and are set so that the focal points thereof are respectively located on the end surfaces b1 to b3 of the corresponding multi-core fibers B1 to B3. The optical axes X1 to X3 (see FIG. 3B) of the condensing lenses 111 to 113 are arranged so as to coincide with any position of the cores of the multi-core fibers B1 to B3. However, the optical axes X1 to X3 may be arranged so as not to coincide with any position of the cores of the multi-core fibers B1 to B3. The condensing lenses 111 to 113 may be integrated into one lens array, and the condensing lenses 111 to 113 may be configured as separate members. Since the condensing lenses 111 to 113 can be arranged as an integrated object in the former case, the configuration and the manufacturing method are facilitated. The optical axis X1 of the condensing lens 111 coincides with the optical axis X1 of the condensing lens 101, the optical axis X2 of the condensing lens 112 coincides with the optical axis X2 of the condensing lens 102, and the optical axis X3 of the condensing lens 113 coincides with the optical axis X3 of the condensing lens 103.

Figure 3A:
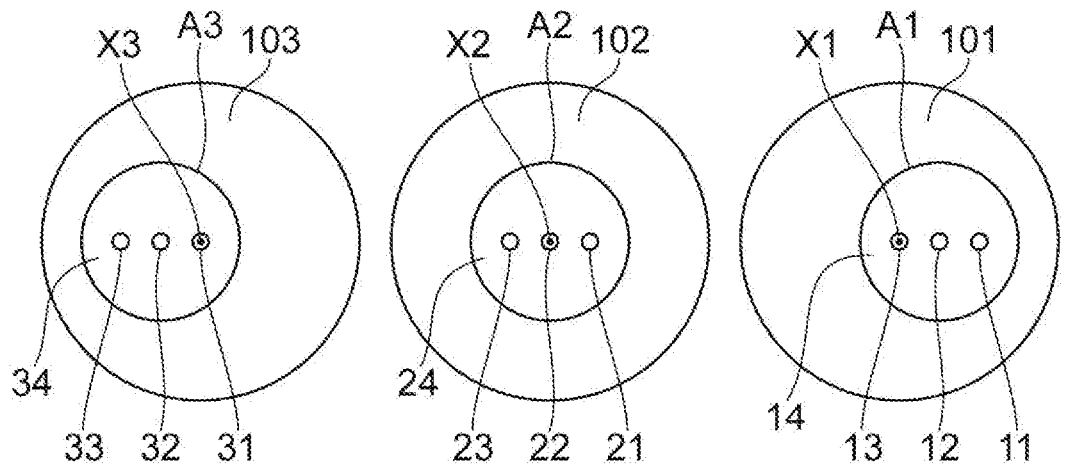
FIG. 3A is a diagram illustrating a positional relationship between each condensing lens and each multi-core fiber of the first multi-core fiber group in the optical connecting structure illustrated in FIG. 2.
Figure 3B:
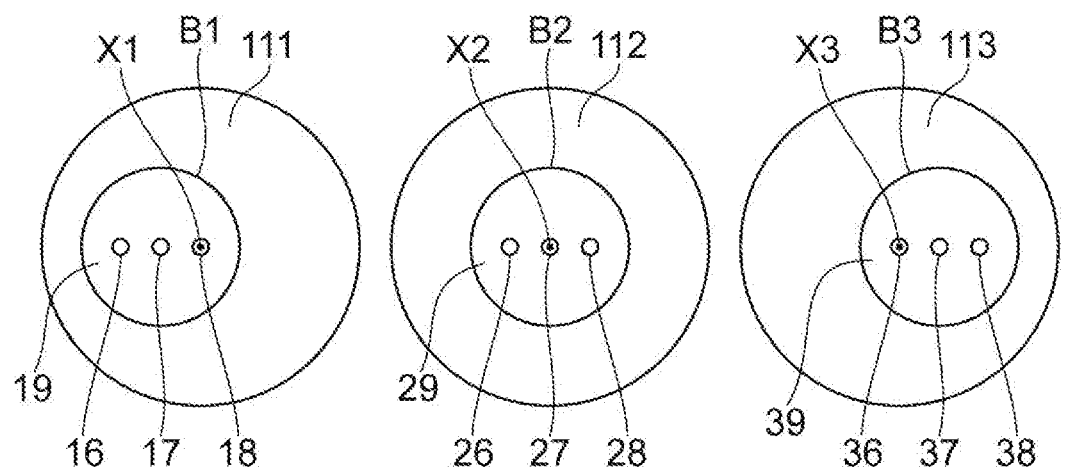
FIG. 3B is a diagram illustrating a positional relationship between each condensing lens and each multi-core fiber of the second multi-core fiber group in the optical connecting structure illustrated in FIG. 2.

A positional relationship between each condensing lens and the cores of each multi-core fiber and a relationship between the core array and the fiber array in the optical connecting structure 1 will be described with reference to FIGS. 3A and 3B. FIG. 3A is a diagram illustrating a positional relationship between each condensing lens and the cores of each multi-core fiber in the first multi-core fiber group A, and FIG. 3B is a diagram illustrating a positional relationship between each condensing lens and the cores of each multi-core fiber of the second multi-core fiber group B. As illustrated in FIG. 3A, the multi-core fiber A1 is disposed so as to be slightly offset from the optical axis X1 toward the outside with respect to the corresponding condensing lens 101. More specifically, a positional relationship therebetween is defined so that the center of the core 13 of the multi-core fiber A1 at the left end illustrated in the drawing coincides with the optical axis X1 of the condensing lens 101. The multi-core fiber A2 is disposed coaxially with the corresponding condensing lens 102 so that the optical axis X2 coincides with the center of the multi-core fiber A2. More specifically, a positional relationship therebetween is defined so that the center of the core 22 of the multi-core fiber A2 at the center illustrated in the drawing coincides with the optical axis X2 of the condensing lens 102. The multi-core fiber A3 is disposed so as to be slightly offset from the optical axis X3 toward the outside with respect to the corresponding condensing lens 103. More specifically, a positional relationship therebetween is defined so that the center of the core 31 of the multi-core fiber A3 at the right end illustrated in the drawing coincides with the optical axis X3 of the condensing lens 103.

A positional relationship between each condensing lens and the cores of each multi-core fiber in the second multi-core fiber group B is set so as to be symmetrical to that of the first multi-core fiber group A. That is, as illustrated in FIG. 3B, the multi-core fiber B1 is disposed so as to be slightly offset from the optical axis X1 toward the outside with respect to the corresponding condensing lens 111. More specifically, a positional relationship therebetween is defined so that the center of the core 18 of the multi-core fiber B1 at the right end illustrated in the drawing coincides with the optical axis X1 of the condensing lens 111. The multi-core fiber B2 is disposed coaxially with the corresponding condensing lens 112 so that the optical axis X2 coincides with the center of the multi-core fiber B2. More specifically, a positional relationship therebetween is defined so that the center of the core 27 of the multi-core fiber B2 at the center illustrated in the drawing coincides with the optical axis X2 of the condensing lens 112. The multi-core fiber B3 is disposed so as to be slightly offset from the optical axis X3 toward the outside with respect to the corresponding condensing lens 113. More specifically, a positional relationship therebetween is defined so that the center of the core 36 of the multi-core fiber B3 at the left end illustrated in the drawing coincides with the optical axis X3 of the condensing lens 113.

The multi-core fibers A1 to A3 are one-dimensionally arranged in a line as illustrated in FIG. 3A. The cores 11 to 13, the cores 21 to 23, and the cores 31 to 33 are also one-dimensionally arranged in the respective fibers. In this way, in the optical connecting structure 1, the multi-core fibers A1 to A3 have the same array as those of the cores 11 to 13, the cores 21 to 23, and the cores 31 to 33 arranged in the fibers of the multi-core fibers A1 to A3. That is, in the first multi-core fiber group A, the fiber array of the multi-core fibers A1 to A3 where the multi-core fibers A1 to A3 are arrayed is similar (homothetic) to the core array of each of the cores 11 to 13, the cores 21 to 23, and the cores 31 to 33, where the cores 11 to 13, the cores 21 to 23, and the cores 31 to 33 are respectively arrayed in each multi-core fiber. In the same manner, the multi-core fibers B1 to B3 are one-dimensionally arranged in a line as illustrated in FIG. 3B. The cores 16 to 18, the cores 26 to 28, and the cores 36 to 38 are also one-dimensionally arranged in the respective fibers. In this way, in the optical connecting structure 1, the multi-core fibers B1 to B3 also have the same array as those of the cores 16 to 18, the cores 26 to 28, and the cores 36 to 38 arranged in the fibers of the multi-core fibers B1 to B3. That is, also in the second multi-core fiber group B, the fiber array of the multi-core fibers B1 to B3 where the multi-core fibers B1 to B3 are arrayed is similar (homothetic) to the core array of each of the cores 16 to 18, the cores 26 to 28, and the cores 36 to 38, where the cores 16 to 18, the cores 26 to 28, and the cores 36 to 38 are respectively arrayed in each multi-core fiber. The multi-core fibers A1 to A3 have the same array as those of the multi-core fibers B1 to B3, but it is preferable that the refractive index distribution is the same in the fibers.

Figure 4A:
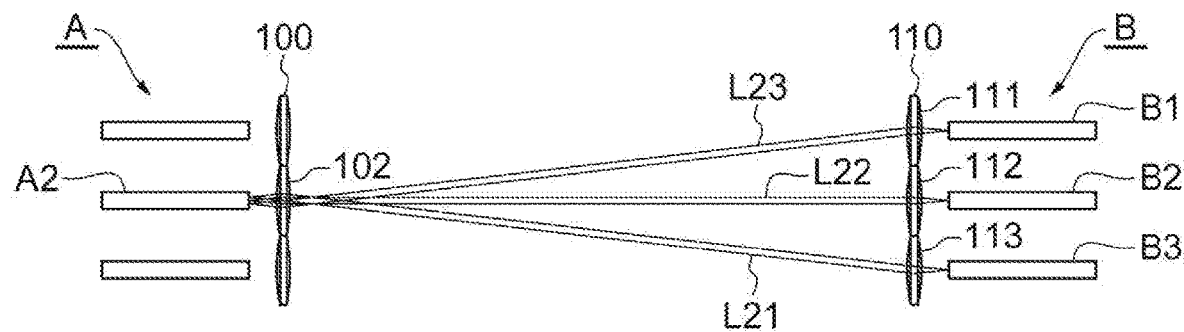
FIGS. 4A to 4C are diagrams each illustrating an optical connecting state between the first multi-core fiber group and the second multi-core fiber group optically connected by the optical connecting structure illustrated in FIG. 2.
Figure 4B:
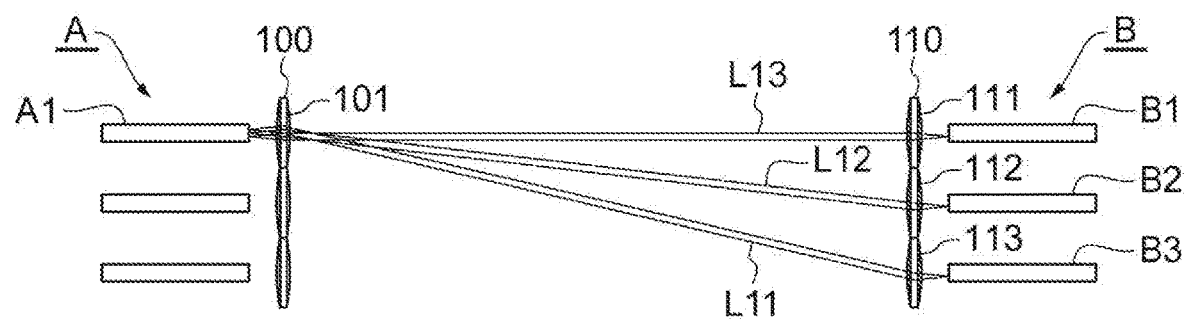
Figure 4C:
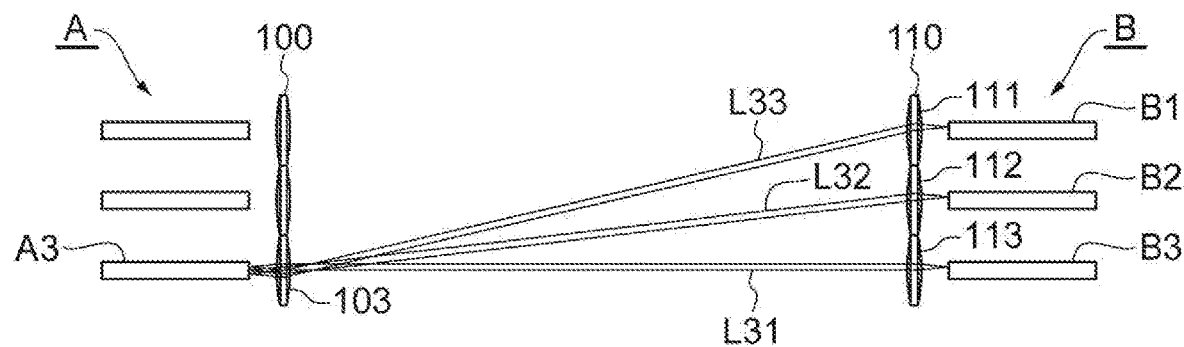

FIGS. 4A to 4C are diagrams illustrating an optical connecting state between the first multi-core fiber group A and the second multi-core fiber group B which are optically connected to each other by the optical connecting structure 1. FIG. 4A illustrates a state in which the light beams L21, L22, and L23 output from three cores 21, 22, and 23 of the multi-core fiber A2 are respectively connected to the cores 37, 27, and 17 of the multi-core fibers B3, B2, and B1. In the optical connection illustrated in FIG. 4A, the light beams L21 and L23 output from the multi-core fiber A2 go with different propagation directions by the condensing lens 102 of the first optical system 100, more specifically, toward opposite sides with respect to the optical axis X2. The light beam L22 goes straight through the condensing lens 102 of the first optical system 100 as it is. These light beams L21, L22, and L23 are condensed on the respective end surfaces of the multi-core fibers B3, B2, and B1 by the respective condensing lenses 113, 112, and 111 of the incident second optical system 110 and are propagated to the respective cores 37, 27, and 17.

Similarly, FIG. 4B illustrates a state in which the light beams L11, L12, and L13 output from three cores 11, 12, and 13 of the multi-core fiber A1 are respectively connected to the cores 38, 28, and 18 of the multi-core fibers B3, B2, and B1. In the optical connection illustrated in FIG. 4B, the light beams L11 and L12 output from the multi-core fiber A1 go with different propagation directions by the condensing lens 101 of the first optical system 100, more specifically, toward the opposite side to the optical axis X1. The light beam L13 goes straight through the condensing lens 101 of the first optical system 100 as it is. These light beams L11, L12, and L13 are condensed on the respective end surfaces of the multi-core fibers B3, B2, and B1 by the respective condensing lenses 113, 112, and 111 of the incident second optical system 110 and are propagated to the respective cores 38, 28, and 18.

Similarly, FIG. 4C illustrates a state in which the light beams L31, L32, and L33 output from three cores 31, 32, and 33 of the multi-core fiber A3 are respectively connected to the cores 36, 26, and 16 of the multi-core fibers B1, B2, and B3. In the optical connection illustrated in FIG. 4C, the light beams L32 and L33 output from the multi-core fiber A3 go with different propagation directions by the condensing lens 103 of the first optical system 100, more specifically, toward the opposite side to the optical axis X3. The light beam L31 goes straight through the condensing lens 103 of the first optical system 100 as it is. These light beams L31, L32, and L33 are condensed on the respective end surfaces of the multi-core fibers B3, B2, and B1 by the respective condensing lenses 113, 112, and 111 of the incident second optical system 110 and are propagated to the respective cores 36, 26, and 16. The first multi-core fiber group A and the second multi-core fiber group B are bilaterally symmetrical to each other and the light is propagated while the above-described optical path is reversed when the light emitted from the second multi-core fiber group B is propagated to the first multi-core fiber group A.

An example of optical paths in which the light beams emitted from the first multi-core fiber group A are incident to the second multi-core fiber group B will be described in more detail with reference to FIGS. 5 to 10.

Figure 5:
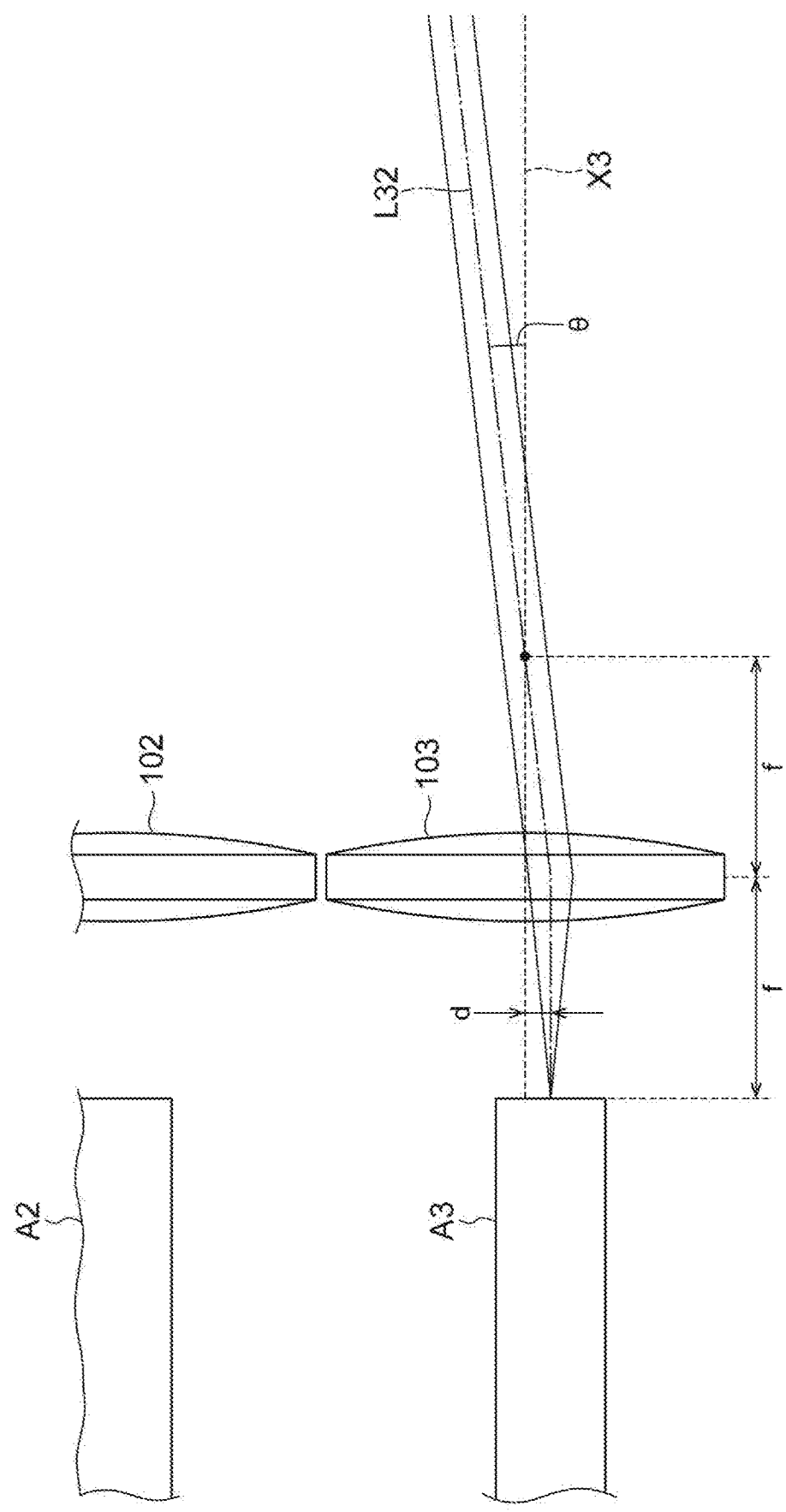
FIG. 5 is an enlarged diagram illustrating an example of light emitted from the first multi-core fiber group.
Figure 6:
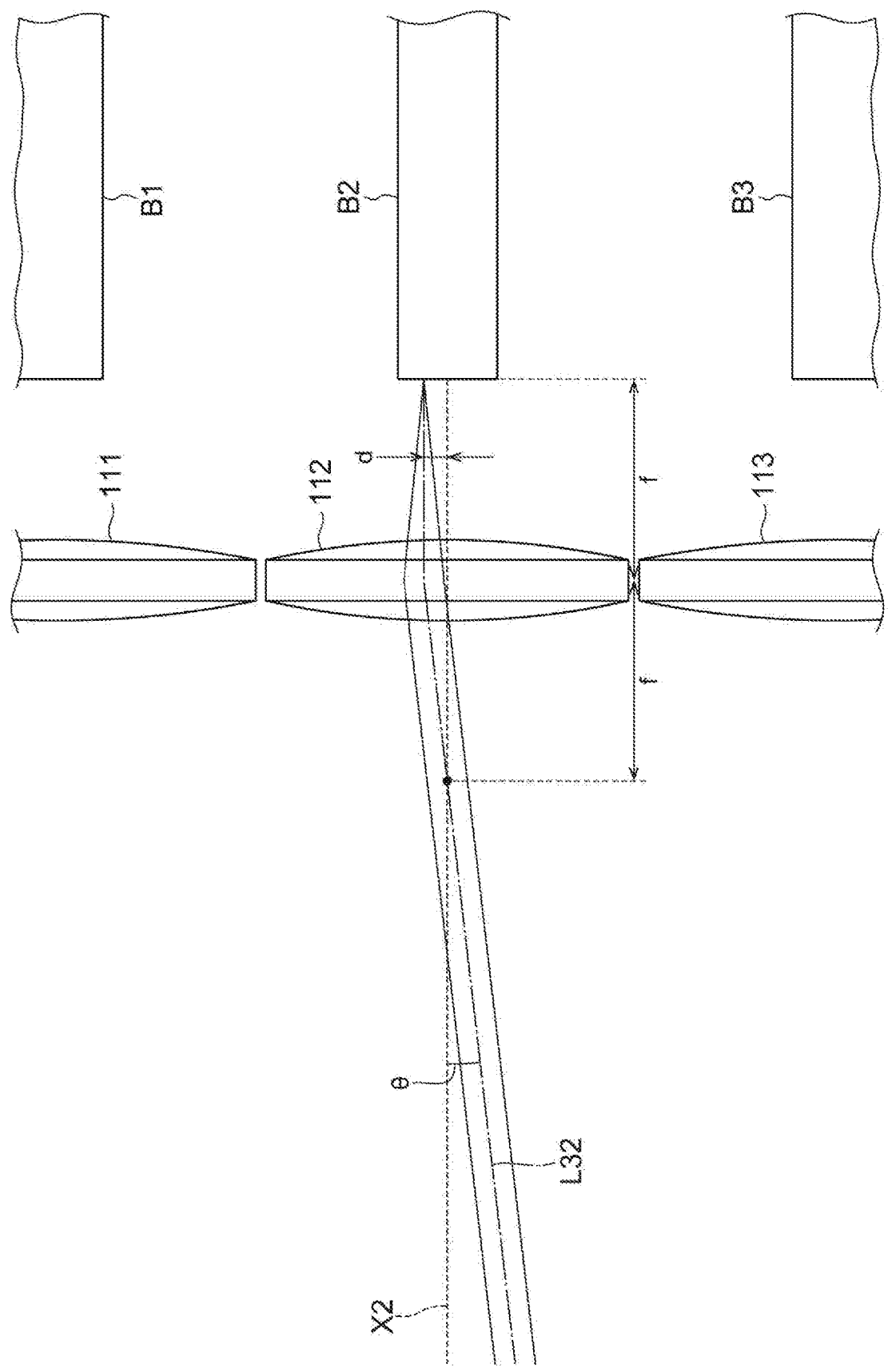
FIG. 6 is an enlarged diagram illustrating an example of light incident to the second multi-core fiber group.

As illustrated in FIG. 5, the condensing lens 103 is disposed on the front surface of the multi-core fiber A3 of the first multi-core fiber group A. The condensing lens 103 is a lens having a focal length f and is configured to set a focal point of the condensing lens 103 on the end surface of the multi-core fiber A3. Since the light beam L32 emitted from the core 32 apart from the optical axis X3 toward the outside by a distance d passes through the opposite focal position when being transmitted through the condensing lens 103, the light beam L32 is propagated at an angle $\theta$ ($=d/f$) with respect to the optical axis X3. Then, as illustrated in FIG. 6, the light beam L32 passing through the opposite focal position at the angle $\theta$ with respect to the optical axis X2 is condensed on a position offset from the optical axis X2 by d ($=\theta/f$) and is propagated to the core 26. The light beam L32 which is propagated from the first optical system 100 to the second optical system 110 is collimated light. The optical axis X2 is parallel to the optical axis X3.

Figure 7:
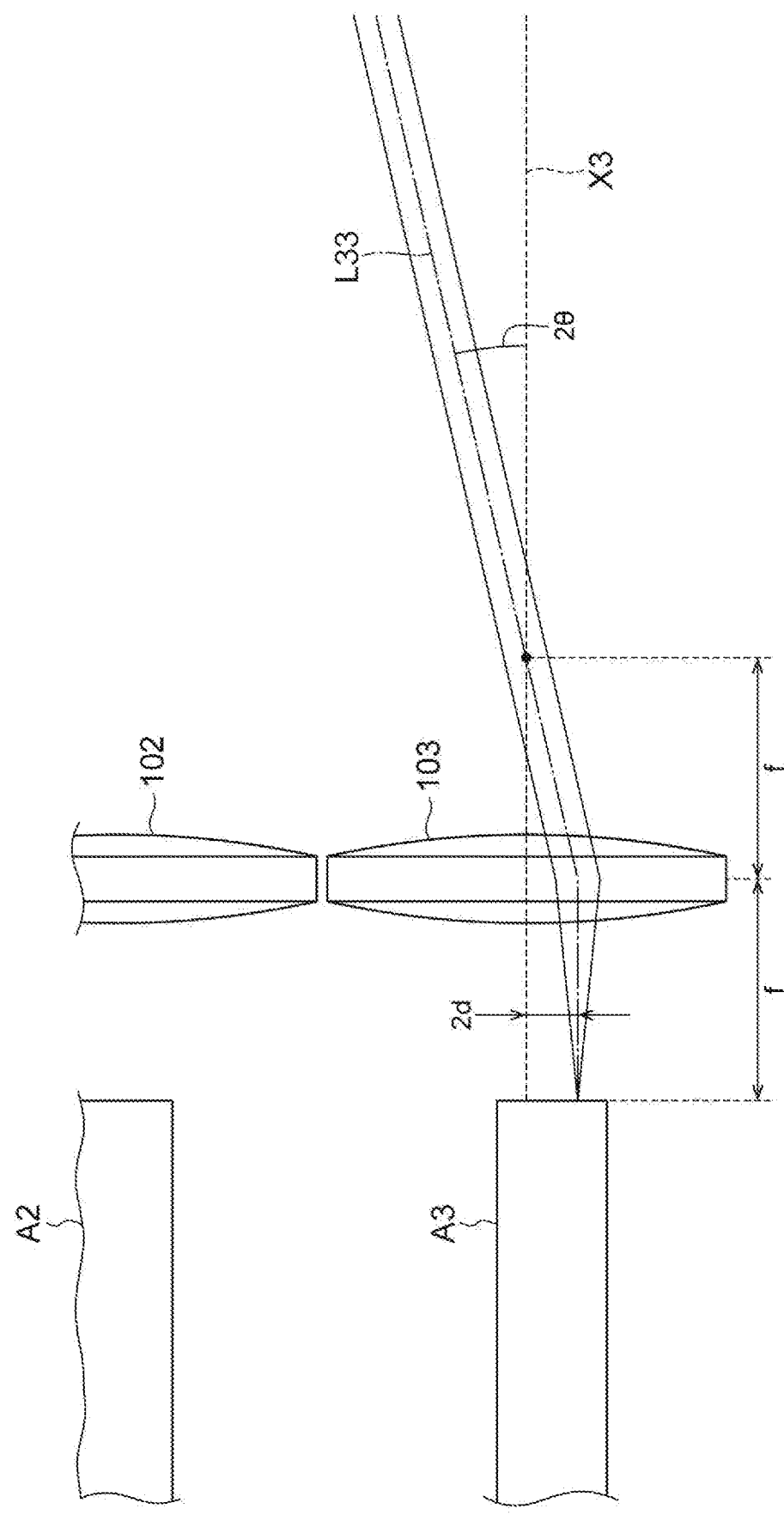
FIG. 7 is an enlarged diagram illustrating another example of light emitted from the first multi-core fiber group.
Figure 8:
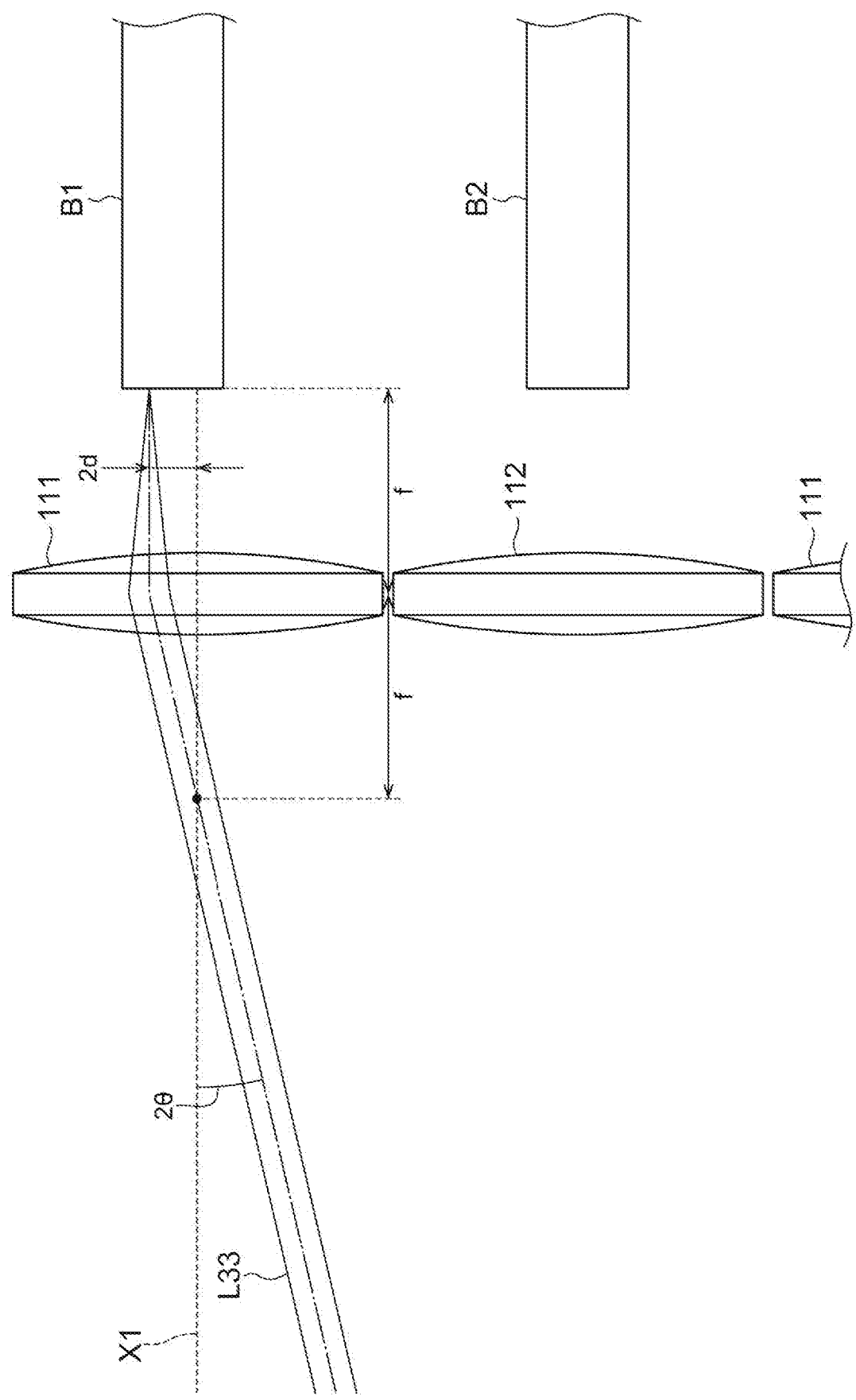
FIG. 8 is an enlarged diagram illustrating another example of light incident to the second multi-core fiber group.

As illustrated in FIG. 7, the condensing lens 103 is disposed on the front surface of the multi-core fiber A3 of the first multi-core fiber group A as described above. The condensing lens 103 is a lens having a focal length f and is configured to set a focal point of the condensing lens 103 on the end surface of the multi-core fiber A3. Since the light beam L33 emitted from the core 33 apart from the optical axis X3 toward the outside by a distance 2d passes through the opposite focal position when being transmitted through the condensing lens 103, the light beam is propagated at an angle $2\theta$ ($=2d/f$) with respect to the optical axis X3. Then, as illustrated in FIG. 8, the light beam L33 passing through the opposite focal position at an angle $2\theta$ with respect to the optical axis X1 is condensed on a position offset from the optical axis X1 by 2d ($=2\theta/f$) and is propagated to the core 16. The light beam L33 which is propagated from the first optical system 100 to the second optical system 110 is collimated light. The optical axis X1 is parallel to the optical axis X3.

Figure 9:
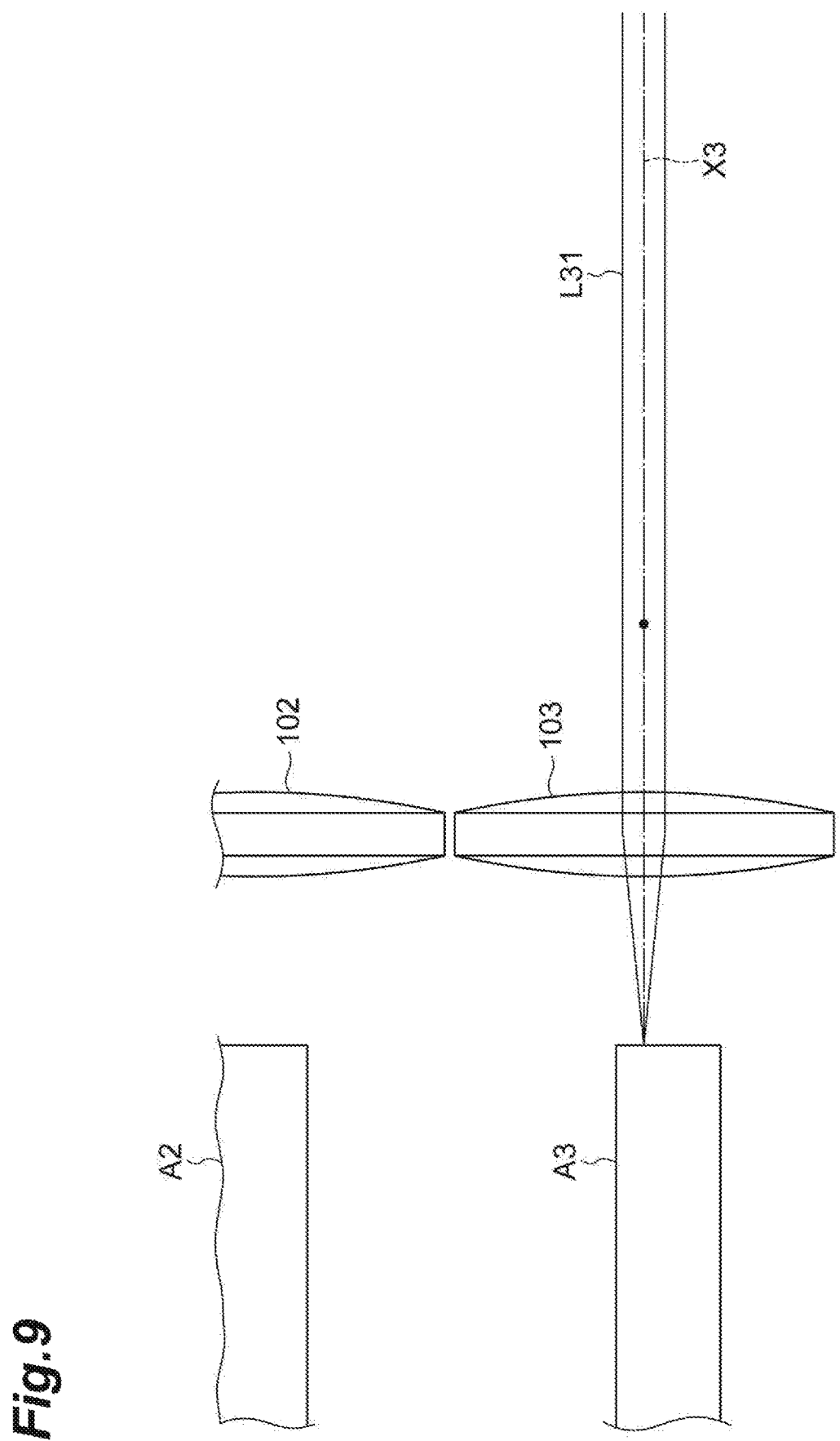
FIG. 9 is an enlarged diagram illustrating still another example of light emitted from the first multi-core fiber group.
Figure 10:
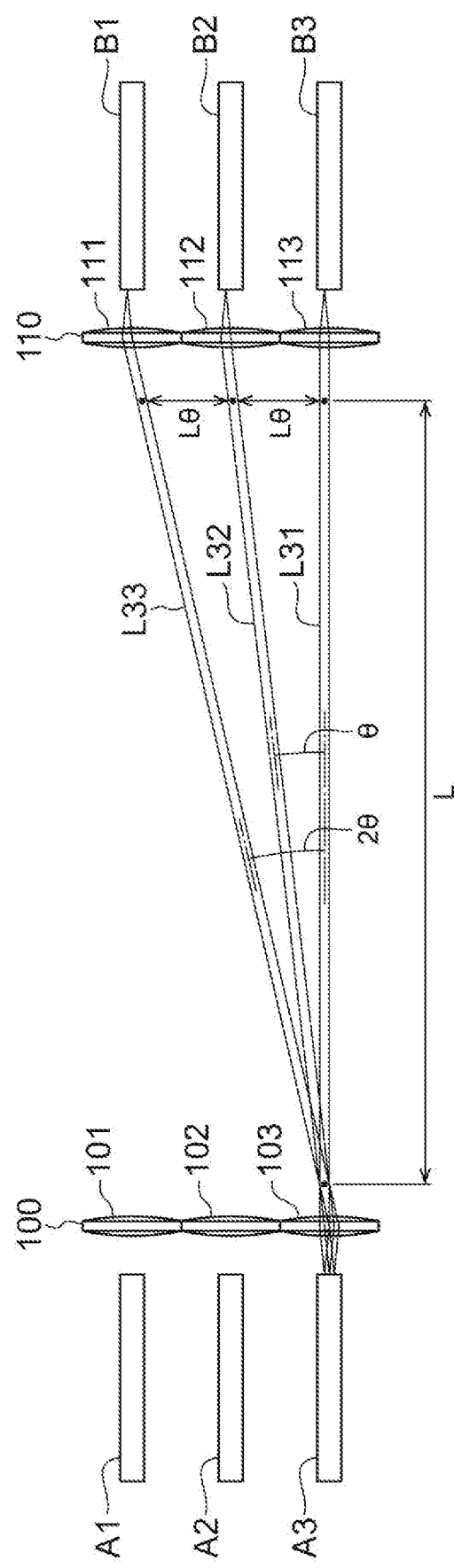
FIG. 10 is a diagram illustrating an example in which a light beam from one multi-core fiber of the first multi-core fiber group is incident to each multi-core fiber of the second multi-core fiber group.

As illustrated in FIG. 9, the light beam L31 emitted from the core 31 located on the optical axis X3 becomes collimated light when being transmitted through the condensing lens 103, goes straight on the optical axis X3 as it is, is condensed by the condensing lens 113 of the second optical system 110, and is propagated to the core 36 of the multi-core fiber B3. FIG. 10 is a diagram summarizing the above describing optical connection. As illustrated in FIG. 10, when a distance between the focal point on the inside of the first optical system 100 and the focal point on the inside of the second optical system 110 is denoted by L, a distance between the branched light beams becomes L$\theta$ and the light beams do not interfere with each other. Since detailed optical paths in which the light beams emitted from the other multi-core fiber A1 or A2 are connected to each multi-core fiber of the second multi-core fiber group B are obvious to those skilled in the art from the description above, the description will be omitted.

As described above, the fiber array of the first multi-core fiber group A corresponds to the respective core arrays of the multi-core fibers A1 to A3, and the fiber array of the second multi-core fiber group B corresponds to the respective core arrays of the multi-core fibers B1 to B3 in the optical connecting structure 1 according to this embodiment, and then, the optical connecting structure 1 optically connects the first multi-core fiber group A with the second multi-core fiber group B. Since each core array in each optical fiber is correlated with the fiber array of the optical fibers themselves, the multi-core fibers A1 to A3 can be optically connected to the multi-core fibers B1 to B3 by a simple configuration using the first optical system 100 and the second optical system 110. Particularly, in the optical connecting structure 1 in which the cores of the multi-core fiber A1, A2, or A3 are branched to the cores of the multi-core fibers B1 to B3, the optical connecting structure 1 is simplified by adopting the above-described array relationship. Accordingly, the miniaturization thereof can be achieved.

The fiber array of the multi-core fibers A1 to A3 is similar to the respective core arrays of the multi-core fibers A1 to A3, and the fiber array of the multi-core fibers B1 to B3 is similar to the respective core arrays of the multi-core fibers B1 to B3 In this embodiment. Thus, the design of the optical connecting structure for connecting the plurality of multi-core fibers A1 to A3 to the plurality of multi-core fibers B1 to B3 can be facilitated. Since the fiber array of the multi-core fibers A1 to A3, the respective core arrays of the fibers of the multi-core fibers A1 to A3, the fiber array of the multi-core fibers B1 to B3, and the respective core arrays of the fibers of the multi-core fibers B1 to B3 are one-dimensionally arranged in this embodiment, the arrangement configuration is further simplified, thereby further miniaturization is possible.

The first optical system 100 is configured to respectively set the focal points of the lenses 101 to 103 on the corresponding end surfaces a1 to a3 of the multi-core fibers A1 to A3, and the second optical system 110 is configured to respectively set the focal points of the lenses 111 to 113 on the corresponding end surfaces of the multi-core fibers B1 to B3, in this embodiment. Thus, the light beams between the first optical system 100 and the second optical system 110 can be the collimated light, and the optical design thereof is facilitated.

The first optical system 100 includes the condensing lenses 101 to 103 corresponding to the multi-core fibers A1 to A3 and the second optical system 110 includes the condensing lenses 111 to 113 corresponding to the multi-core fibers B1 to B3 in this embodiment.

Thus, the propagation directions of light beams emitted from each multi-core fiber can be more accurately set. The condensing lenses 101 to 103 may be integrated into one lens array, and the condensing lenses 111 to 113 may be integrated into one lens array in this embodiment. In this case, the optical design thereof or the manufacturing of the device can be facilitated.

The multi-core fibers A1 to A3 have the same core array and refractive index distribution as those of the multi-core fibers B1 to B3 in this embodiment. Thus, the optical design of the entire optical connecting structure can be facilitated.

Second Embodiment

A second embodiment of the present disclosure will be described. In an optical connecting structure according to the second embodiment, the optical fiber array and the core arrays in the optical fibers are different from those of the optical connecting structure 1 according to the first embodiment. Hereinafter, differences from the first embodiment will be mainly described.

Figure 11:
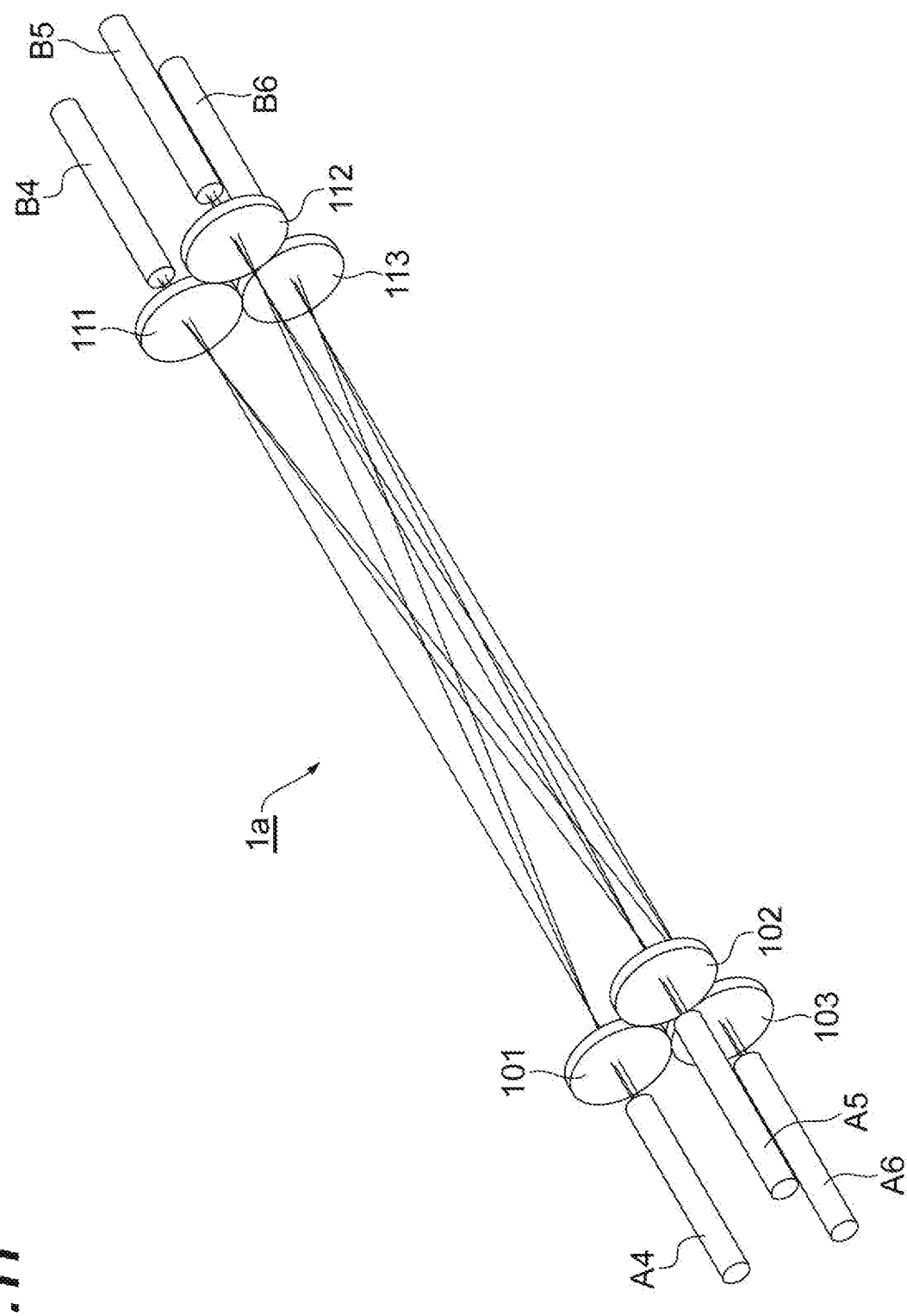
FIG. 11 is a perspective view illustrating an example of an optical connecting structure according to a second embodiment.
Figure 13A:
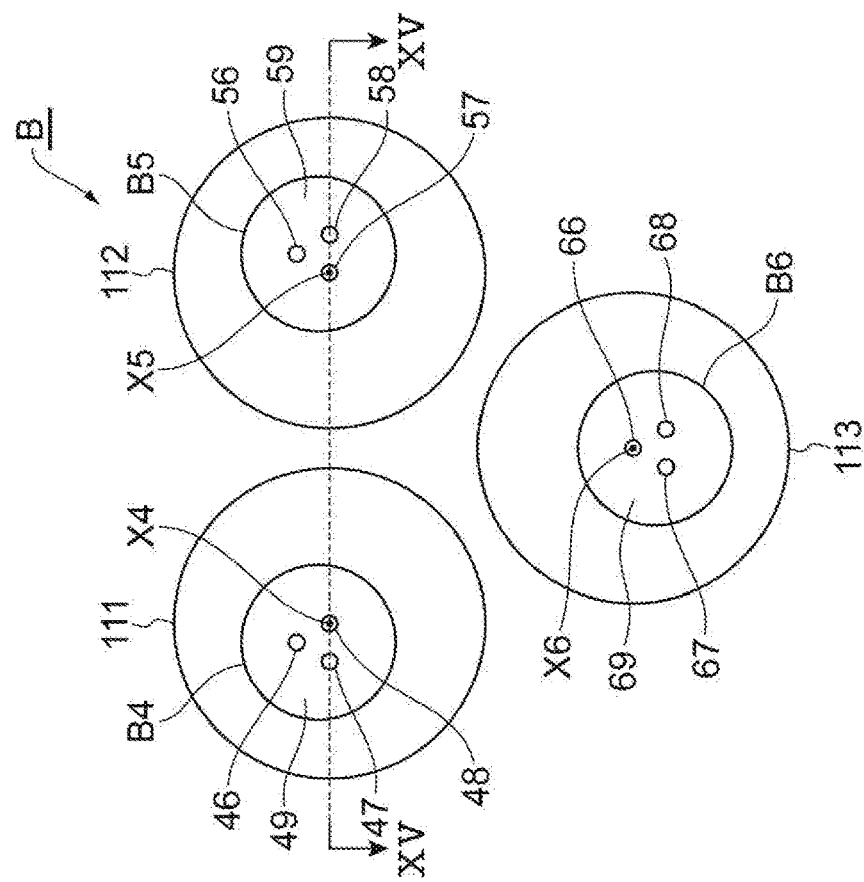
FIG. 13A and FIG. 13B are diagrams illustrating each positional relationship between each multi-core fiber and each condensing lens of the optical connecting structure according to the second embodiment.
Figure 13B:
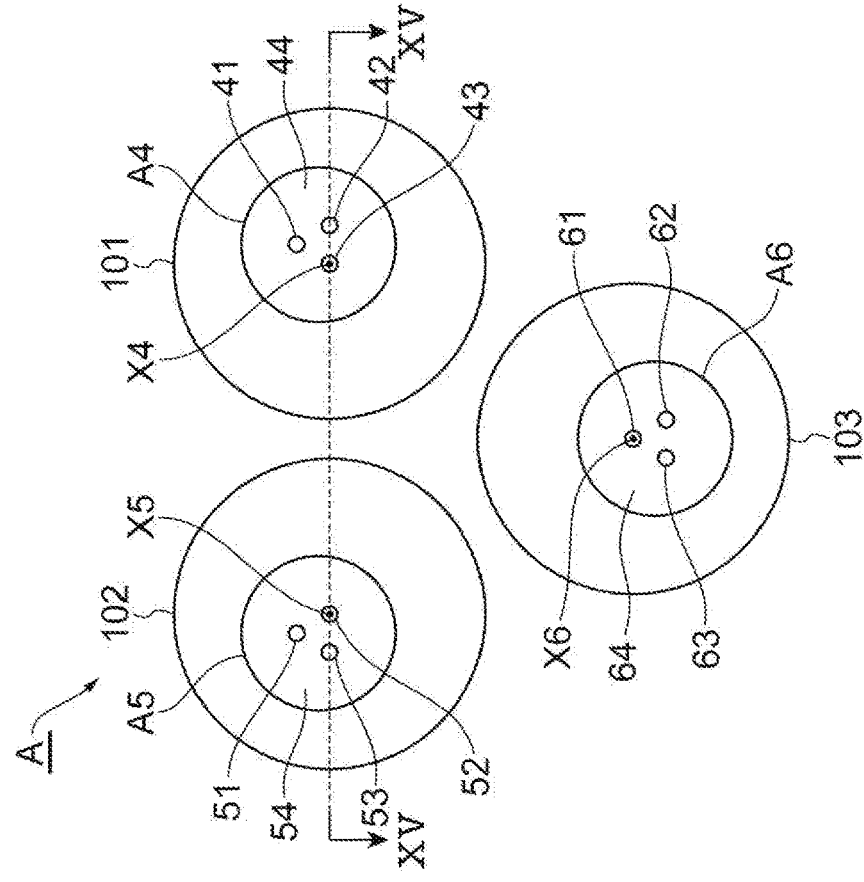

FIG. 11 is a perspective view illustrating an example of the optical connecting structure according to the second embodiment. FIGS. 12A and 12B are cross-sectional views schematically illustrating the fiber arrays and the core arrays of multi-core fibers A4, A5, and A6 and multi-core fibers B4, B5, and B6 used in the optical connecting structure according to the second embodiment. FIG. 13A and FIG. 13B are diagrams illustrating positional relationships between the multi-core fibers and the condensing lenses of the optical connecting structure according to the second embodiment. FIG. 13A illustrates a positional relationship of the first multi-core fiber group A, and FIG. 13B illustrates a positional relationship of the second multi-core fiber group B.

As illustrated in FIG. 11, FIGS. 12A and 12B, and FIGS. 13A and 13B, in an optical connecting structure 1a according to this embodiment, the multi-core fibers and the cores are two-dimensionally arranged in a plane orthogonal to the optical axis. More specifically, the multi-core fibers A4 to A6 are two-dimensionally arranged as illustrated in FIGS. 12A and 13A. Cores 41 to 43, cores 51 to 53, and cores 61 to 63 are also two-dimensionally arranged. In this way, in the optical connecting structure 1a, the arrangement of the multi-core fibers A4 to A6 is similar to an array in which the core array of the cores 41 to 43, the cores 51 to 53, and the cores 61 to 63 arranged in the respective fibers of the multi-core fibers A4 to A6 are rotated around respective optical axes X4 to X6 by 180°. The cores 41 to 43, the cores 51 to 53, and the cores 61 to 63 are respectively covered with a cladding 44, a cladding 54, and a cladding 64 to thereby constitute the multi-core fiber.

Similarly, the multi-core fibers B4 to B6 are two-dimensionally arranged as illustrated in FIGS. 12B and 13B. Cores 46 to 48, cores 56 to 58, and cores 66 to 68 are also two-dimensionally arranged in the respective fibers. In this way, in the optical connecting structure 1a, the fiber array of the multi-core fibers B4 to B6 is also similar to an array in which the core array of the cores 46 to 48, the cores 56 to 58, and the cores 66 to 68 arranged in the respective fibers of the multi-core fibers B4 to B6 are rotated around the respective optical axes X4 to X6 by 180°. The cores 46 to 48, the cores 56 to 58, and the cores 66 to 68 are respectively covered with a cladding 49, a cladding 59, and a cladding 69 to thereby constitute the multi-core fiber.

A positional relationship between each condensing lens and the cores of each multi-core fiber of the second embodiment will be described with reference to FIGS. 13A and 13B. As illustrated in FIG. 13A, the multi-core fiber A4 is disposed so as to be slightly offset from the optical axis X4 toward the outside with respect to the corresponding condensing lens 101. More specifically, a positional relationship therebetween is defined so that the center of the core 43 of the multi-core fiber A4 at the left end illustrated in the drawing coincides with the optical axis X4 of the condensing lens 101. The multi-core fiber A5 is disposed so as to be slightly offset from the optical axis X5 toward the outside with respect to the corresponding condensing lens 102. More specifically, a positional relationship therebetween is defined so that the center of the core 52 of the multi-core fiber A5 at the right end illustrated in the drawing coincides with the optical axis X5 of the condensing lens 102. The multi-core fiber A6 is disposed so as to be slightly offset from the optical axis X6 toward the outside with respect to the corresponding condensing lens 103. More specifically, a positional relationship therebetween is defined so that the center of the core 61 of the multi-core fiber A6 at the upper side illustrated in the drawing coincides with the optical axis X6 of the condensing lens 103. In the second embodiment, the cores 43, 52, and 61 at the center side coincide with the respective optical axes. However, the core at the center side may not coincide with each optical axis.

As illustrated in FIG. 13B, in the side of the second multi-core fiber group B, the multi-core fiber B4 is disposed so as to be slightly offset from the optical axis X4 toward the outside with respect to the corresponding condensing lens 111. More specifically, a positional relationship therebetween is defined so that the center of the core 48 of the multi-core fiber B4 at the right end illustrated in the drawing coincides with the optical axis X4 of the condensing lens 111. The multi-core fiber B5 is disposed so as to be slightly offset from the optical axis X5 toward the outside with respect to the corresponding condensing lens 112. More specifically, a positional relationship therebetween is defined so that the center of the core 57 of the multi-core fiber A5 at the left end illustrated in the drawing coincides with the optical axis X5 of the condensing lens 112. The multi-core fiber B6 is disposed so as to be slightly offset from the optical axis X6 toward the outside with respect to the corresponding condensing lens 113. More specifically, a positional relationship therebetween is defined so that the center of the core 66 of the multi-core fiber B6 at the upper side illustrated in the drawing coincides with the optical axis X6 of the condensing lens 113. In the second embodiment, the cores 48, 57, and 66 at the center side coincide with the respective optical axes. However, the core at the center side may not coincide with each optical axis.

Figure 14:
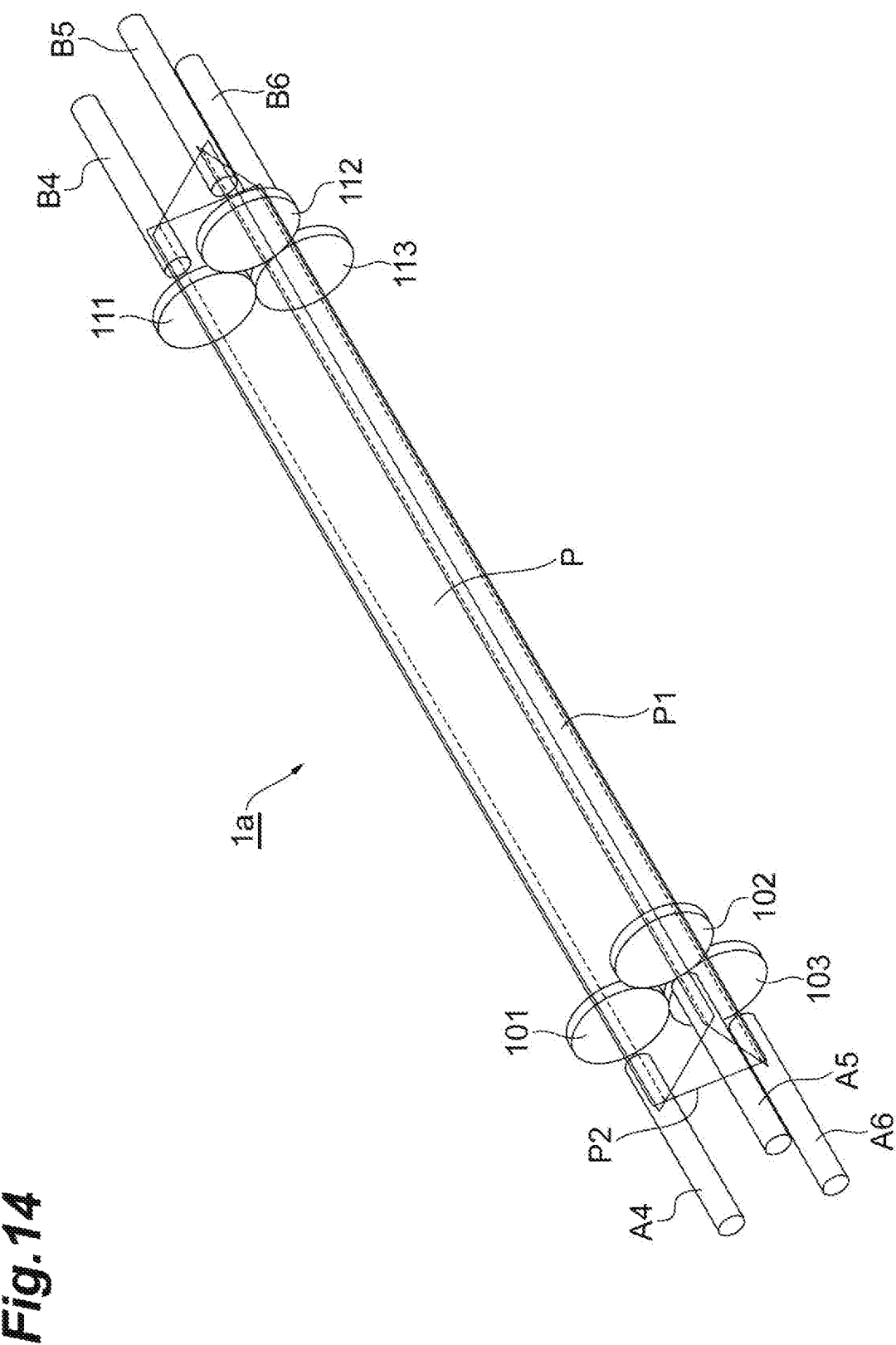
FIG. 14 is a perspective view illustrating an example of the optical connecting structure according to the second embodiment.
Figure 15:
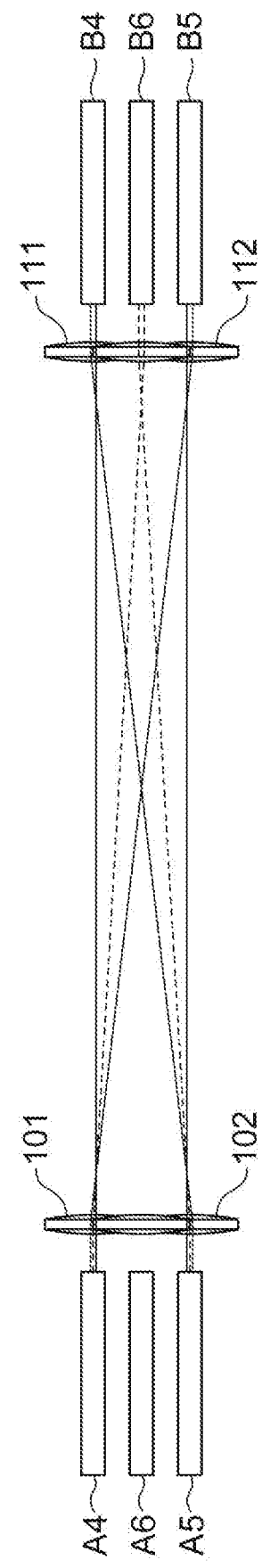
FIG. 15 is a cross-sectional view taken along a virtual cross-section P of the optical connecting structure illustrated in FIG. 14.

Next, an overall configuration of the optical connecting structure 1a according to the second embodiment will be described with reference to FIGS. 11 to 15. FIG. 14 is a perspective view illustrating an example of the optical connecting structure according to the second embodiment. FIG. 15 is a cross-sectional view taken along a virtual cross-section P of the optical connecting structure illustrated in FIG. 14 and illustrates an example of an optical connection between the cores along the line XV-XV of FIGS. 13A and 13B. As illustrated in FIG. 11 to FIGS. 13A and 13B, the multi-core fibers A4 to A6 of the first multi-core fiber group A are optically connected to the multi-core fibers B4 to B6 of the second multi-core fiber group B through the first optical system 100 which includes the condensing lenses 101 to 103 and the second optical system 110 which includes the condensing lenses 111 to 113.

The first multi-core fiber group A are optically connected to the second multi-core fiber group B, as shown in Table 2 below. The core 41, the core 42, and the core 43 of the multi-core fiber A4 are respectively optically connected to the core 68 of the multi-core fiber B6, the core 58 of the multi-core fiber B5, and the core 48 of the multi-core fiber B4. The core 51, the core 52, and the core 53 of the multi-core fiber A5 are respectively optically connected to the core 67 of the multi-core fiber B6, the core 57 of the multi-core fiber B5, and the core 47 of the multi-core fiber B4. The core 61, the core 62, and the core 63 of the multi-core fiber A6 are respectively optically connected to the core 66 of the multi-core fiber B6, the core 56 of the multi-core fiber B5, and the core 46 of the multi-core fiber B4.

TABLE 2

| First multi-core fiber group | Core | | Second multi-core fiber group | Core |
|---|---|---|---|---|
| Multi-core fiber A4 | Core 41 | ⇔ | Multi-core fiber B6 | Core 68 |
| | Core 42 | ⇔ | Multi-core fiber B5 | Core 58 |
| | Core 43 | ⇔ | Multi-core fiber B4 | Core 48 |
| Multi-core fiber A5 | Core 51 | ⇔ | Multi-core fiber B6 | Core 67 |
| | Core 52 | ⇔ | Multi-core fiber B5 | Core 57 |
| | Core 53 | ⇔ | Multi-core fiber B4 | Core 47 |
| Multi-core fiber A6 | Core 61 | ⇔ | Multi-core fiber B6 | Core 66 |
| | Core 62 | ⇔ | Multi-core fiber B5 | Core 56 |
| | Core 63 | ⇔ | Multi-core fiber B4 | Core 46 |

As an example of the above-described optical connection, for example, as illustrated in FIGS. 13A and 13B to FIG. 15, each light beam emitted from the multi-core fiber A4 is incident to each core of the multi-core fibers B4 to B6 and each light beam emitted from the multi-core fiber A5 is incident to each of different cores of the multi-core fibers B4 to B6. In FIG. 15, the optical connecting from the core 41 of the multi-core fiber A4 to the core 68 of the multi-core fiber B6 and the optical connecting from the core 51 of the multi-core fiber A5 to the core 67 of the multi-core fiber B6 are indicated by dotted lines. The optical connection for connecting the multi-core fibers A4 to A6 to the multi-core fibers B4 to B6 in the cross-sections taken along virtual cross-sections P1 and P2 illustrated in FIG. 14 can be also indicated by the same drawing.

The optical connecting structure according to this embodiment can obtain the same operation and effect as those of the first embodiment. In addition, the fiber array of the first multi-core fiber group A is similar to an array in which the core array of each of the multi-core fibers A4 to A6 is rotated around the optical axis by 180° and the fiber array of the second multi-core fiber group B is similar to an array in which the core array of each of the multi-core fibers B4 to B6 is rotated around the optical axis by 180°, in this embodiment. According to the second embodiment, the multi-core fibers or the cores in each multi-core fiber can be easily arranged two-dimensionally, and thus, an optical connecting structure having a higher packaging density can be provided and further miniaturization can be achieved.

Although the embodiments of the present disclosure have been described above in detail, the present disclosure is not limited to the above-described embodiments and can be applied to various embodiments. For example, in the above-described embodiments, a case in which the number of the cores in each optical fiber is three has been described, but the number of the cores in each optical fiber may be seven or eight. Further, in the above-described embodiments, a case in which the number of one multi-core fibers is three has been described, but the present disclosure is not limited thereto. The number of one multi-core fibers may be two or four or more.

What is claimed is:

1. An optical connecting structure for connecting multi-core fibers, comprising:
a plurality of first multi-core fibers of which each optical fiber includes a plurality of cores;
a plurality of second multi-core fibers of which each optical fiber includes a plurality of cores;
a first optical system which allows at least a part of light beams emitted from the cores of each first multi-core fiber to have different propagation directions; and
a second optical system which allows each light beam emitted from each first multi-core fiber and propagated through the first optical system to be condensed on the plurality of second multi-core fibers,
wherein a first fiber array where the first multi-core fibers are arrayed corresponds to a first core array where the cores in the respective optical fibers of the first multi-core fibers are arrayed, in a first surface intersecting an optical axis of the first optical system, and
wherein a second fiber array where the second multi-core fibers are arrayed corresponds to a second core array where the cores in the respective optical fibers of the second multi-core fibers are arrayed, in a second surface intersecting an optical axis of the second optical system,
wherein the first multi-core fibers and the second multi-core fibers are arranged such that first end surfaces of the first multi-core fibers face second end surfaces of the second multi-core fibers.

2. The optical connecting structure for connecting multi-core fibers according to claim 1, wherein the first optical system is configured to set respective focal points thereof on corresponding end surfaces of the first multi-core fibers, and the second optical system is configured to set respective focal points thereof on corresponding end surfaces of the of second multi-core fibers.

3. The optical connecting structure for connecting multi-core fibers according to claim 1, wherein the first optical system includes first lenses each corresponding to each first multi-core fiber, and the second optical system includes second lenses each corresponding to each second multi-core fiber.

4. The optical connecting structure for connecting multi-core fibers according to claim 3, wherein the first lenses are integrated into one first lens array and the second lenses are integrated into one second lens array.

5. The optical connecting structure for connecting multi-core fibers according to claim 1, wherein the respective first multi-core fibers have the same core array and refractive index distribution as those of the second multi-core fiber.

6. The optical connecting structure for connecting multi-core fibers according to claim 1, wherein the first fiber array is similar to the first core array, and the second fiber array is similar to the second core array.

7. The optical connecting structure for connecting multi-core fibers according to claim 6, wherein the first fiber array, the first core array, the second fiber array and the second core array are one-dimensional arrays.

8. The optical connecting structure for connecting multi-core fibers according to claim 1, wherein the first fiber array is similar to an array in which the first core array is rotated around a fiber optical axis by 180°, and the second fiber array is similar to an array in which the second core array is rotated around a fiber optical axis by 180°.

9. The optical connecting structure for connecting multi-core fibers according to claim 8, wherein the first fiber array, the first core array, the second fiber array and the second core array are two-dimensional arrays.

10. The optical connecting structure for connecting multi-core fibers according to claim 1, where the first optical system is disposed adjacent to the first end surfaces of the first multi-core fibers and the second optical system is disposed adjacent to the second end surfaces of the second multi-core fibers, and the first optical system and the second optical system are located between the first end surfaces and the second end surfaces.

11. The optical connecting structure for connecting multi-core fibers according to claim 1, wherein the first multi-core fibers include at least three multi-core fibers and the second multi-core fibers include at least three multi-core fibers.

12. An optical connecting structure for connecting multi-core fibers, comprising:
   a plurality of first multi-core fibers of which each optical fiber includes a plurality of cores;
   a plurality of second multi-core fibers of which each optical fiber includes a plurality of cores;
   a first optical system which allows at least a part of light beams emitted from the cores of each first multi-core fiber to have different propagation directions; and
   a second optical system which allows each light beam emitted from each first multi-core fiber and propagated through the first optical system to be condensed on the plurality of second multi-core fibers,
   wherein a first fiber array where the first multi-core fibers are arrayed corresponds to a first core array where the cores in the respective optical fibers of the first multi-core fibers are arrayed, in a first surface intersecting an optical axis of the first optical system, and
   wherein a second fiber array where the second multi-core fibers are arrayed corresponds to a second core array where the cores in the respective optical fibers of the second multi-core fibers are arrayed, in a second surface intersecting an optical axis of the second optical system,
   wherein the first fiber array is similar to the first core array, and the second fiber array is similar to the second core array, and
   wherein the first fiber array, the first core array, the second fiber array and the second core array are one-dimensional arrays.

13. An optical connecting structure for connecting multi-core fibers, comprising:
   a plurality of first multi-core fibers of which each optical fiber includes a plurality of cores;
   a plurality of second multi-core fibers of which each optical fiber includes a plurality of cores;
   a first optical system which allows at least a part of light beams emitted from the cores of each first multi-core fiber to have different propagation directions; and
   a second optical system which allows each light beam emitted from each first multi-core fiber and propagated through the first optical system to be condensed on the plurality of second multi-core fibers,
   wherein a first fiber array where the first multi-core fibers are arrayed corresponds to a first core array where the cores in the respective optical fibers of the first multi-core fibers are arrayed, in a first surface intersecting an optical axis of the first optical system, and
   wherein a second fiber array where the second multi-core fibers are arrayed corresponds to a second core array where the cores in the respective optical fibers of the second multi-core fibers are arrayed, in a second surface intersecting an optical axis of the second optical system, and
   wherein the first multi-core fibers include at least three multi-core fibers and the second multi-core fibers include at least three multi-core fibers.

14. The optical connecting structure for connecting multi-core fibers according to claim 13, wherein the first optical system is configured to set respective focal points thereof on corresponding end surfaces of the first multi-core fibers, and the second optical system is configured to set respective focal points thereof on corresponding end surfaces of the of second multi-core fibers.

15. The optical connecting structure for connecting multi-core fibers according to claim 13, wherein the first optical system includes first lenses each corresponding to each first multi-core fiber, and the second optical system includes second lenses each corresponding to each second multi-core fiber.

16. The optical connecting structure for connecting multi-core fibers according to claim 15, wherein the first lenses are integrated into one first lens array and the second lenses are integrated into one second lens array.

17. The optical connecting structure for connecting multi-core fibers according to claim 13, wherein the respective first multi-core fibers have the same core array and refractive index distribution as those of the second multi-core fiber.

18. The optical connecting structure for connecting multi-core fibers according to claim 13,
   wherein the first fiber array is similar to the first core array, and the second fiber array is similar to the second core array,
   wherein the first fiber array, the first core array, the second fiber array and the second core array are one-dimensional arrays.

19. The optical connecting structure for connecting multi-core fibers according to claim 13, wherein the first fiber array is similar to an array in which the first core array is rotated around a fiber optical axis by 180°, and the second fiber array is similar to an array in which the second core array is rotated around a fiber optical axis by 180°,
   wherein the first fiber array, the first core array, the second fiber array and the second core array are two-dimensional arrays.

20. The optical connecting structure for connecting multi-core fibers according to claim 13, where the first optical system is disposed adjacent to first end surfaces of the first multi-core fibers and the second optical system is disposed adjacent to second end surfaces of the second multi-core fibers, and the first optical system and the second optical system are located between the first end surfaces and the second end surfaces.

* * * * *